(12) United States Patent
Liu et al.

(10) Patent No.: US 6,593,011 B2
(45) Date of Patent: Jul. 15, 2003

(54) LIGHT EMITTING DIODE AND METHOD FOR MAKING THE SAME

(75) Inventors: Ru-Shi Liu, Taipei Hsien (TW); Chien-Yuan Wang, Taipei Hsien (TW); Ting-Shan Chan, Taipei Hsien (TW); Jeffrey Su, Taipei Hsien (TW); Michael Hsing, Taipei Hsien (TW)

(73) Assignee: Lite-On Electronics, Inc., Taipei Hsien (TW)

( * ) Notice: Subject to any disclaimer, the term of this patent is extended or adjusted under 35 U.S.C. 154(b) by 8 days.

(21) Appl. No.: 09/910,891

(22) Filed: Jul. 24, 2001

(65) Prior Publication Data

US 2003/0099859 A1 May 29, 2003

(51) Int. Cl.[7] .......................... H05B 33/14; H05B 33/20
(52) U.S. Cl. ........................ 428/690; 428/917; 313/506; 313/509; 252/301.4 R; 427/66
(58) Field of Search ................................ 428/690, 917; 313/506, 509; 252/301.4 R; 427/66

(56) References Cited

U.S. PATENT DOCUMENTS

| 4,855,189 A | * | 8/1989 | Simopoulos et al. | ....... 428/690 |
| 5,094,185 A | * | 3/1992 | Simopoulos et al. | ....... 118/716 |
| 5,688,318 A | * | 11/1997 | Milstein et al. | ................. 117/1 |
| 6,162,553 A | * | 12/2000 | Ercoli | ......................... 428/690 |
| 6,207,077 B1 | * | 3/2001 | Burnell-Jones | ........ 252/301.36 |

FOREIGN PATENT DOCUMENTS

| JP | 06-349580 | * 12/1994 |

* cited by examiner

*Primary Examiner*—Cynthia H. Kelly
*Assistant Examiner*—Dawn Garrett
(74) *Attorney, Agent, or Firm*—Rosenberg, Klein & Lee

(57) ABSTRACT

A light emitting diode and a method for making the same are proposed. The LED comprises an inorganic phosphor, a silicon compound and an organic glue. The silicon compound has one side being completely or partially C1–C6 alkyl oxide reacted with the inorganic phosphor to modify the surface property of the inorganic phosphor and another side being a functional group selected from a group consisting of epoxy, C1–C6 alkyl, phenyl, amino. The inorganic phosphor with modified surface property can be uniformly mixed in the glue and less deposition is produced.

10 Claims, 2 Drawing Sheets

LIGHT EMITTING DIODE AND METHOD FOR MAKING THE SAME

FIELD OF THE INVENTION

The present invention relates to a light emitting diode and the method for making the same, especially to a light emitting diode with inorganic phosphor having modified surface property to enhance yield.

BACKGROUND OF THE INVENTION

The white light LED developed by Nichia company is composed of a blue LED generally made of InGaN and a yellow inorganic phosphor made of YAG (yttrium aluminum garnet). The yellow inorganic phosphor is excited by blue light from the blue LED and emits yellow light, which is mixed with the blue light to generate white light. The white light LED typically shows a color temperature of 8000 K at a forward current of 20 mA. The color rendering index (CRI) of the white light LED is comparable with the fluorescent lamp and the efficiency of the white light LED is comparable with light bulb (5–10 lm/W) and fluorescent lamp (10–30 lm/W).

In comparison with the LED set composed of three primitive colors (red, green and blue), the white light LED using yellow phosphor has advantages of simple structure and low cost. The color degradation probability due to failure of LED of respective color can be reduced. The white light LED is a light source with high directiveness and can be used for vehicle panel lighting, backlight of LCD, room lightening, notebook computer display, scanner, FAX, projector and cellulous phone.

The white light LED also has the advantages of compactness, long life, low current/voltage, no thermal radiation, and power saving and is expected as light source replacement for conventional light bulb.

The yellow YAG phosphor in the white light LED of Nichia company is firstly mixed with resin with suitable ratio and is then packaged with a blue LED. The yellow YAG phosphor is an inorganic compound, which is hard to mix with the organic resin. Moreover, the weight ratio of the yellow YAG phosphor and the organic resin is also large such that it is hard for the yellow YAG phosphor powder to suspend in the organic resin.

To overcome above problem, resin of high viscosity or other type of glue are used to mix with the YAG phosphor. The glue can be classified into two types, inorganic and organic. For example silicone is an inorganic glue with high viscosity. However, the transparency is only 80% and the applicability thereof is limited. For organic glue such as epoxy resin, the epoxy resin with high viscosity is commercially available with lower price. However, the allowable processing time is short.

The above-mentioned glues with high viscosity can prevent the phosphor powder from deposition. However, the above-mentioned glues have following drawbacks:

(1) The glues with high viscosity cannot be mixed uniformly with the phosphor powder.

(2) For the glues with high viscosity, the amount thereof is hard to control and the yield is influenced.

SUMMARY OF THE INVENTION

It is the object of the present invention to provide an LED to overcome above problems and having enhanced yield and brightness.

To achieve above object, the present invention provides an LED comprising an inorganic phosphor, a silicon compound and an organic glue. The silicon compound has one side being completely or partially C1–C6 alkyl oxide reacted with the inorganic phosphor to modify the surface property of the inorganic phosphor and another side being a functional group selected from a group consisting of epoxy, C1–C6 alkyl, phenyl, amino. The inorganic phosphor with modified surface property can be uniformly mixed in the glue and less deposition is produced.

The various objects and advantages of the present invention will be more readily understood from the following detailed description when read in conjunction with the appended drawing, in which:

DETAILED DESCRIPTION OF THE PRESENT INVENTION

Figure 1:
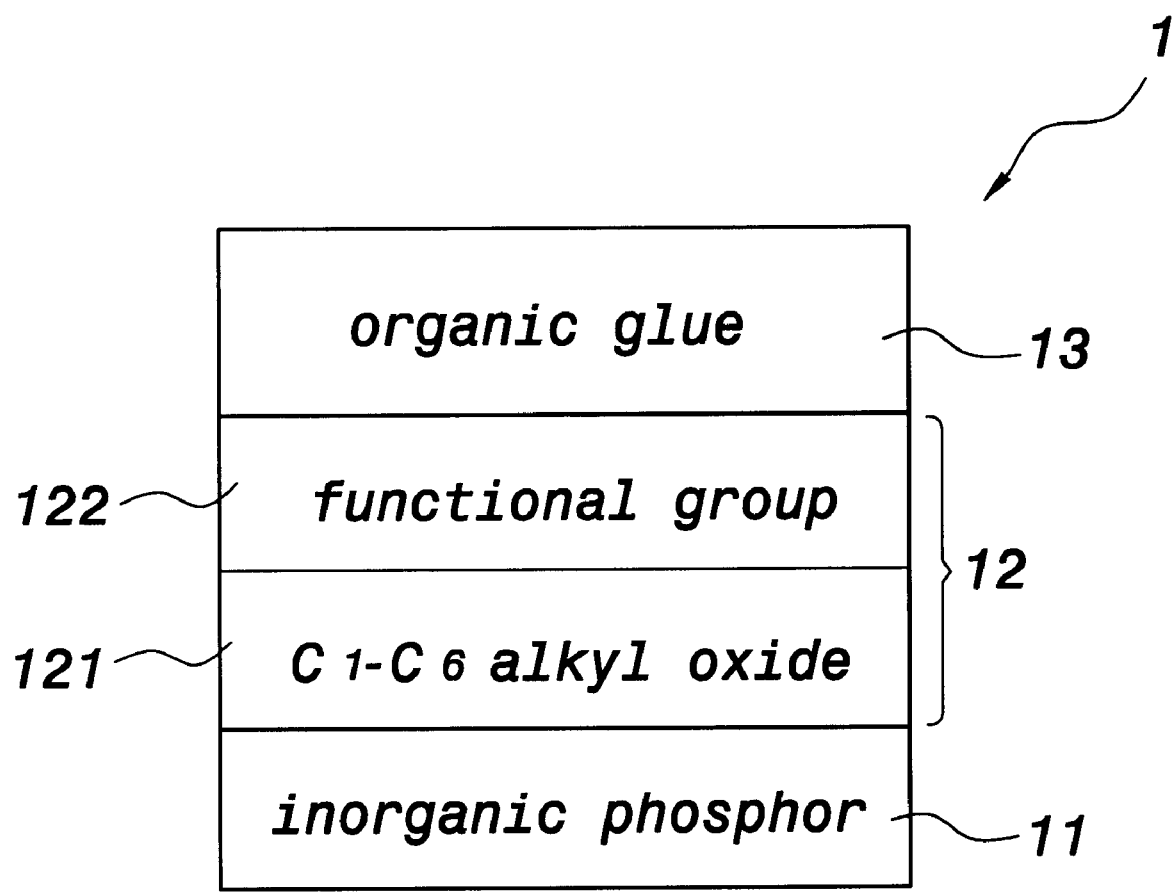
FIG. 1 shows the structure of the present invention.

With reference now to FIG. 1, the LED according to the present invention comprises an inorganic phosphor 11, a silicon compound 12 and an organic glue 13. The inorganic phosphor 11 can be selected from the group consisting of YAG, oxide, sulfide, and phosphate. The inorganic phosphor 11 has one side 121 being completely or partially C1–C6 alkyl oxide reacted with the inorganic phosphor 11 to modify the surface property of the inorganic phosphor 11. The C1–C6 alkyl oxide can be either methoxy or ethyloxy and preferably be methoxy. The inorganic phosphor 11 has another side 122 being a functional group 122 reacted with the organic glue 13. The functional group can be selected from a group consisting of epoxy, C1–C6 alkyl, phenyl, amino and is preferably epoxy. The inorganic phosphor 11 with modified surface can be uniformly distributed in the glue 13 and not easily deposited. The process is stable to enhance yield. The glue 13 can be selected from a group consisting epoxy resin, phenolic resin, polyurethane resin, amino resin and polyester resin.

Table 1 shows the preferred embodiment of the present invention, the inorganic phosphor 11 is a YAG phosphor 11, the silicon compound 12 is a alkyl oxide containing silicon, such as γ-glycidoxypropyl (dimethoxy) methylsilane, and the glue 13 is an epoxy resin.

TABLE 1

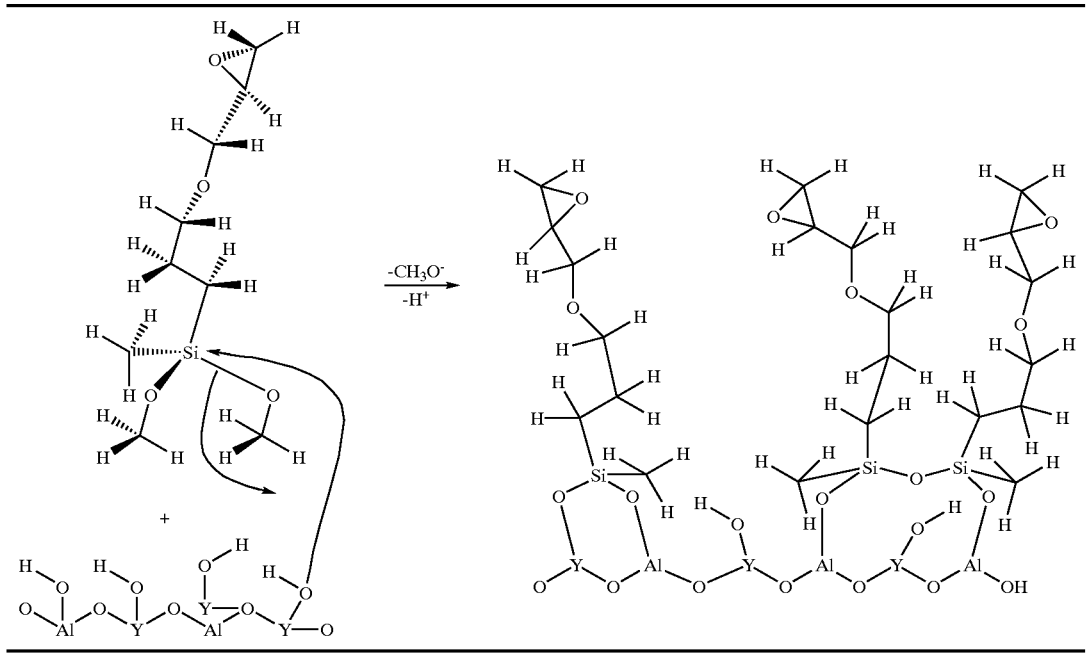

The outer surface of the YAG phosphor 11 is in contact with the water molecule in air and hydroxyl is present on the outer surface thereof. The hydroxyl on the outer surface of the YAG phosphor 11 is reacted with the silicon alkyl oxide such that the alkyl oxide is divagated and the oxygen in the hydroxyl is reacted with silicon to form a compound with Y (or Al)—O—Si binding. The binding is a covalent binding with strong binding force such that the YAG phosphor 11 is firmly attached with the silicon compound 12.

In above-mentioned surface modifying process, 2 g of YAG phosphor and 0.15 g of alkyl oxide containing silicon are mixed in 100 ml of 95% alcoholic solution. The mixed solution is supersonic shocked for 10 min and heated at 70° C. for 1 hr. The precipitation of the solution is removed by sifting and washed by ethyl alcohol. The solution is then dried at 85° C. to obtain YAG phosphor powder with modified surface.

Another side of the silicon alkyl oxide 12 is a functional group resoluble in organic solution. The silicon alkyl oxide 12 with modified surface can be easily reacted with epoxy resin and the link reaction between the silicon alkyl oxide 12 and the epoxy resin enhances the stability of YAG phosphor resolved in the epoxy resin and reduces deposit. The YAG phosphor can be uniformly mixed in the epoxy resin to enhance yield.

Figure 2:
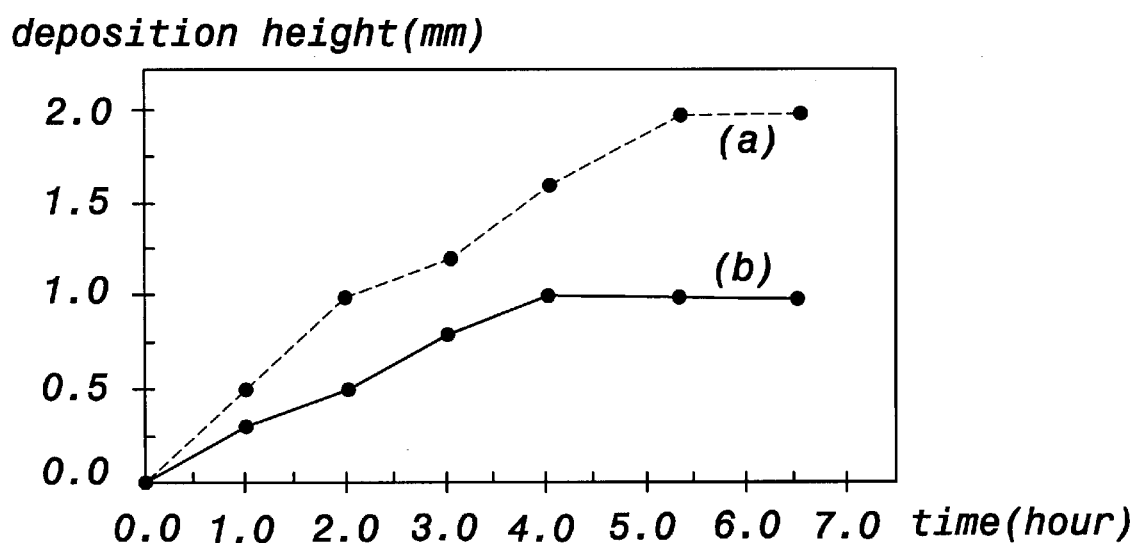
FIG. 2 shows the deposition height comparison for the present invention.

For comparison, 2 g of YAG phosphor with surface treatment and 2 g of YAG phosphor without surface treatment are mixed with 10 g of epoxy resin, respectively and the timing diagram for deposition height is shown in FIG. 2. As shown in this figure, after 6.5 hours, the deposition height of the YAG phosphor with surface treatment is 1 mm as indicated by solid line, and the deposition height of the YAG phosphor without surface treatment is 2 mm as indicated by dashed line. The deposition height is an index for non-uniform mixing. Therefore, the YAG phosphor with surface treatment proposed by the present invention can be uniformly mixed with epoxy resin.

For comparison, the YAG phosphor with surface treatment and the YAG phosphor without surface treatment are mixed with epoxy resin, respectively and then packaged with a blue LED to assemble a white LED. The brightness for the white LED composed YAG phosphor with surface treatment is enhanced over the white LED composed YAG phosphor without surface treatment by 4–6%.

To sum up, YAG phosphor 11 with surface treatment can be uniformly mixed in glue 13 and the link reaction therebetween enhance compactness. The deposition is reduced and the yield is enhanced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A light emitting diode, comprising:
    an inorganic phosphor;
    a silicon compound having one side being at least partially C1–C6 alkyl oxide reacted with the inorganic phosphor to modify the surface property of the inorganic phosphor, and another side including a functional group selected from a group consisting of epoxy, C1–C6 alkyl, phenyl, and amino; and
    an organic glue reacted with the functional group;
    the phosphor and the silicon compound forming an ultrasonically induced chemical bond one with the other;
    whereby the inorganic phosphor with modified surface property can be uniformly combined with the glue.

2. The light emitting diode as in claim 1, wherein the inorganic phosphor can be selected from the group consisting of YAG (yttrium aluminum garnet), an oxide, a sulfide, and a phosphate.

3. The light emitting diode as in claim 1, wherein the C1–C6 alkyl oxide can be either methoxy or ethyloxy.

4. The light emitting diode as in claim 1, wherein the glue can be selected from a group consisting of epoxy resin, phenolic resin, polyurethane resin, amino resin and polyester resin.

5. A manufacturing method for light emitting diode, comprising the steps of:
 (a) preparing an inorganic phosphor;
 (b) mixing the inorganic phosphor with a silicon compound in an alcoholic solution to form a mixed solution;
 (c) ultrasonically shocking and thereafter heating the mixed solution, the inorganic phosphor being responsively reacted with a silicon alkyl oxide to form a surface modified phosphor;
 (d) mixing the surface modified phosphor with an organic glue, the phosphor being thereby uniformly suspended within the organic glue.

6. The manufacturing method for light emitting diode as in claim 5, wherein in step (a) the inorganic phosphor can be selected from the group consisting of YAG (yttrium aluminum garnet), an oxide, a sulfide, and a phosphate.

7. The manufacturing method for light emitting diode as in claim 5, wherein in step (b) the silicon compound has one side being at least partially C1–C6 alkyl oxide reacted with the inorganic phosphor to modify the surface property of the inorganic phosphor, and another side including a functional group selected from a group consisting of epoxy, C1–C6 alkyl, phenyl, and amino.

8. The manufacturing method for light emitting diode as in claim 7, wherein the C1–C6 alkyl oxide can be either methoxy or ethyloxy.

9. The manufacturing method for light emitting diode as in claim 5, wherein in step (c), the glue can be selected from a group consisting epoxy resin, phenolic resin, polyurethane resin, amino resin and polyester resin.

10. The manufacturing method for light emitting diode as in claim 7, wherein the inorganic phosphor is chemically bonded at the side of the silicon compound with C1–C6 alkyl oxide.

* * * * *